(12) United States Patent
Petkov et al.

(10) Patent No.: US 11,206,464 B2
(45) Date of Patent: Dec. 21, 2021

(54) METHOD AND DEVICE FOR OPERATING A BATTERY-OPERATED SMART METERING METER

(71) Applicant: DIEHL METERING SYSTEMS GMBH, Nuremberg (DE)

(72) Inventors: Hristo Petkov, Nuremberg (DE);
Thomas Lautenbacher, Erlangen (DE);
Thomas Kauppert, Nuremberg (DE);
Klaus Gottschalk, Winkelhaid (DE)

(73) Assignee: Diehl Metering Systems GmbH, Nuremberg (DE)

( * ) Notice: Subject to any disclaimer, the term of this patent is extended or adjusted under 35 U.S.C. 154(b) by 0 days.

(21) Appl. No.: 16/657,454

(22) Filed: Oct. 18, 2019

(65) Prior Publication Data
US 2020/0053437 A1 Feb. 13, 2020

(30) Foreign Application Priority Data
May 5, 2017 (DE) ..................... 10 2017 004 365.5

(51) Int. Cl.
*H04Q 9/02* (2006.01)
*H04W 4/38* (2018.01)
*H04W 52/28* (2009.01)

(52) U.S. Cl.
CPC ............... *H04Q 9/02* (2013.01); *H04W 4/38* (2018.02); *H04W 52/286* (2013.01);
(Continued)

(58) Field of Classification Search
CPC ........ H04Q 9/00; H04Q 9/02; H04Q 2209/00; H04Q 2209/10; H04Q 2209/40;
(Continued)

(56) References Cited

U.S. PATENT DOCUMENTS 6,954,646 B2    10/2005  Churt
7,109,875 B2 *   9/2006  Ota ...................... G08B 25/009
                                              320/132
(Continued)

FOREIGN PATENT DOCUMENTS

DE          10152554 B4    11/2007
DE       102007061325 B3     5/2009
(Continued)

*Primary Examiner* — Franklin D Balseca
(74) *Attorney, Agent, or Firm* — Laurence A. Greenberg; Werner H. Stemer; Ralph E. Locher

(57) ABSTRACT

A method and a device are used during battery operation of a smart metering meter equipped with a consumption sensor and a transmit clock generator for a radio module for transmitting consumption data packets, in the event of a decreased residual capacity of the battery, to determine if the data packets can be transmitted as previously with the residual capacity over the residual time period until a scheduled battery exchange at the end of a specified operating time period. If not, the transmit power, for example, of the data packets is reduced and/or their transmit clock is extended over the residual period. This determination, along with a control specification, are preferably performed in a concentrator and are transmitted to the meter by using bidirectionally operating radio modules so that computer capacities required therefor need not be retained in each individual meter of a supply area.

11 Claims, 2 Drawing Sheets

Figure 1:
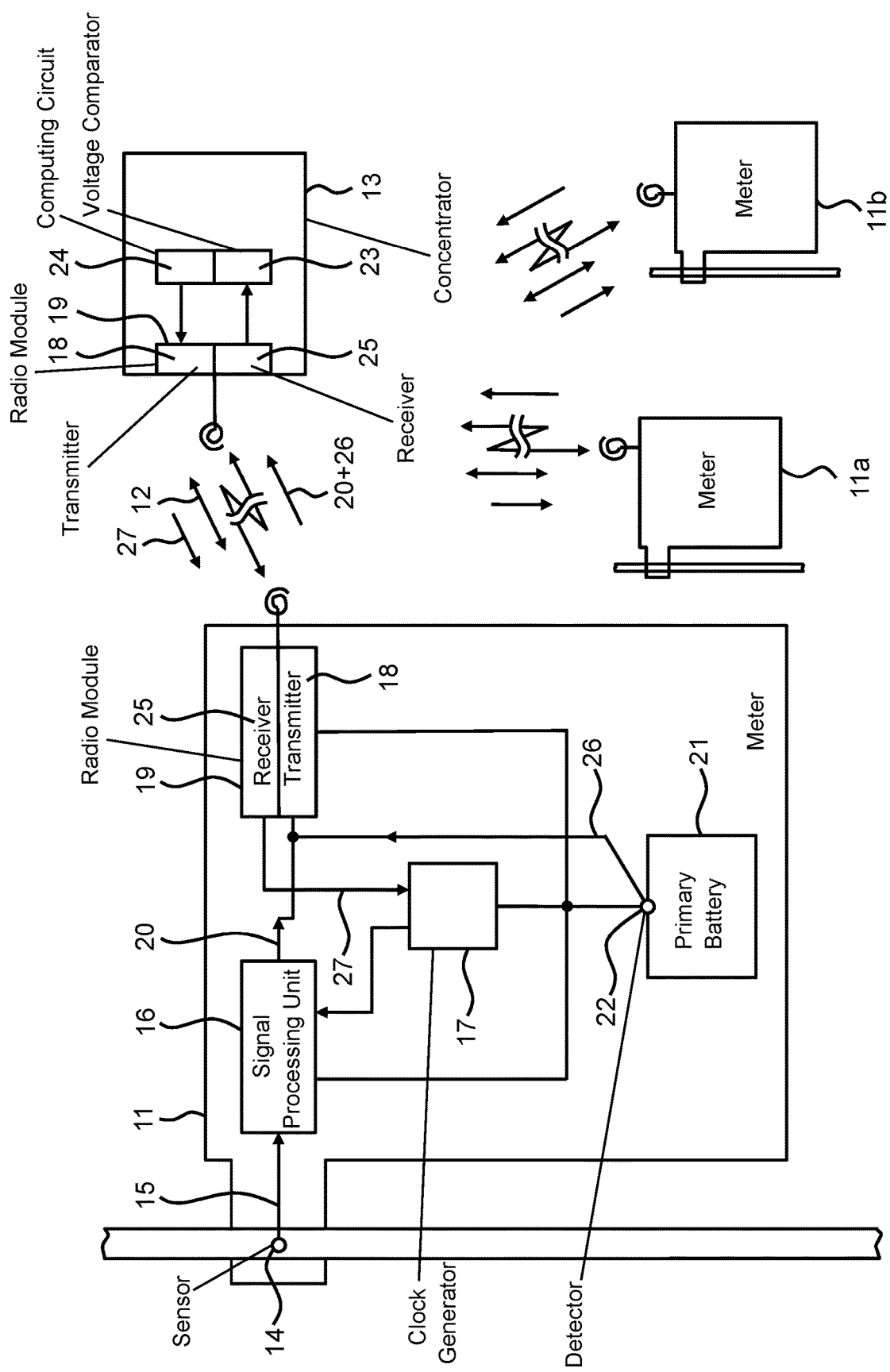

(52) U.S. Cl.
CPC ..... *H04Q 2209/40* (2013.01); *H04Q 2209/60* (2013.01); *H04Q 2209/823* (2013.01)

(58) Field of Classification Search
CPC ........... H04Q 2209/60; H04Q 2209/70; H04Q 2209/80; H04Q 2209/823; H04Q 2209/88; H04Q 2209/883; G01D 4/00; G01D 4/002; G01D 4/004; H04W 4/38; H04W 52/286
See application file for complete search history.

(56) References Cited

U.S. PATENT DOCUMENTS

| | | | | |
|---|---|---|---|---|
| 7,142,107 | B2* | 11/2006 | Kates | G08B 25/001 |
| | | | | 340/539.1 |
| 7,583,625 | B2* | 9/2009 | Bennett | H04W 52/24 |
| | | | | 370/311 |
| 8,358,298 | B2* | 1/2013 | Lee | G06F 1/3265 |
| | | | | 345/211 |
| 9,656,621 | B2* | 5/2017 | Curtis | B60R 16/0231 |
| 10,444,769 | B2* | 10/2019 | Weiler | G05B 19/042 |
| 2009/0146838 | A1* | 6/2009 | Katz | G01D 4/006 |
| | | | | 340/870.02 |
| 2010/0184489 | A1* | 7/2010 | Penther | H04W 52/029 |
| | | | | 455/574 |
| 2016/0366649 | A1 | 12/2016 | Bernhard et al. | |
| 2017/0013561 | A1 | 1/2017 | Soldati | |
| 2017/0070063 | A1* | 3/2017 | Chhaya | H02J 7/007 |
| 2017/0164288 | A1 | 6/2017 | Iwai | |
| 2017/0235357 | A1* | 8/2017 | Leung | G06F 1/3265 |
| | | | | 713/310 |
| 2017/0374623 | A1* | 12/2017 | Dhar | H04W 52/146 |
| 2020/0053437 | A1* | 2/2020 | Petkov | H04W 52/0219 |

FOREIGN PATENT DOCUMENTS

| | | | |
|---|---|---|---|
| JP | H09252326 A | | 9/1997 |
| JP | 11055176 A | | 2/1999 |
| JP | 2003115092 A | | 4/2003 |
| JP | 2011151616 A | | 8/2011 |
| JP | 2013104987 A | | 5/2013 |
| JP | 2014138231 A | * 7/2014 | ............. H04N 7/173 |
| JP | 2015014537 A | | 1/2015 |
| WO | 2017187175 A1 | | 11/2017 |

* cited by examiner

METHOD AND DEVICE FOR OPERATING A BATTERY-OPERATED SMART METERING METER

CROSS-REFERENCE TO RELATED APPLICATION

This is a continuation application, under 35 U.S.C. § 120, of copending International Application PCT/EP2018/000192, filed Apr. 11, 2018, which designated the United States; this application also claims the priority, under 35 U.S.C. § 119, of German Patent Application DE 10 2017 004 365.5, filed May 5, 2017; the prior application is herewith incorporated by reference in its entirety.

BACKGROUND OF THE INVENTION

Field of the Invention

The invention relates to a method and a device for the battery operation of smart metering meters having a consumption sensor and a transmit clock generator for transmitting consumption data packets by radio over a specified operating time period by using a battery.

In smart metering, as described, for example, in German Patent DE 101 52 554 B4, corresponding to U.S. Pat. No. 6,954,646, the aim is to equip each consumption point for line-connected energy sources such as electricity, gas, water or district heating with a meter for signals generated by a metering device depending on consumption, and with a radio module for wireless short-range packet transmission of the currently accumulated digitized meter reading through one of the license-free-accessible ISM frequency bands to a concentrator. It receives and stores the packets (also referred to as messages) individualized by meter addresses and comparatively frequently received from different meters operated in the receiving area and, in some instances, carries out a preprocessing, for example for a data plausibility check. The data temporarily stored in concentrators are transmitted comparatively infrequently through long-range radio data transmission, for example in accordance with a WLAN or mobile radiocommunication standard, to a network headend, for example to the billing or operations management center of an energy supply company for the energy source in that supply area.

The meter which is inaccessible to the consumer is equipped with a long-life battery which is intended to necessitate a battery change (possibly together with a metering device recalibration) only after an operating period of at least twelve years. For logistical, technical and cost reasons, all meters or at least their batteries are exchanged more or less simultaneously at the end of that specified operating time period in the supply area, even if some of the batteries still have sufficient capacity for further operation at that time. On the other hand, however, if the battery in one of the meters operated in the supply area is prematurely exhausted, the unscheduled exchange incurs considerable additional manpower-related and financial outlay, particularly for the short residual time period until the next, i.e. scheduled, exchange at the end of the operational time period in the entire supply area.

SUMMARY OF THE INVENTION

It is accordingly an object of the invention to provide a method and a device for operating a battery-operated smart metering meter, which overcome the hereinafore-mentioned disadvantages of the heretofore-known methods and devices of this general type and which avoid the requirement for an unscheduled, premature battery exchange in the smart metering meter.

This object is achieved according to the combinations of the important features indicated in the independent patent claims by extending the still available residual operating period of a battery threatening premature exhaustion through targeted load relief thereof until (at least) the end of the scheduled operating time period by modifying parameters of the radio link depending on the residual capacity of the battery to provide an extension of the residual operating time period.

With the foregoing and other objects in view it is provided, for this purpose, in accordance with the invention, particularly in the event of reduced battery capacity after a certain operating period, for the number of data packets still transmittable with this battery to be defined in order to then transmit the data packets in the residual time period with radio parameters modified to extend the residual time period, for example reduced only in terms of data rate, waveform, clock and/or level.

A detector operating in the meter is provided to record the behavior, in particular the characteristic of the discharge curve, or at least of the present, particularly load-dependent and temperature-dependent state, of the battery. A usable state criterion of this type is the present battery voltage or the present internal resistance of the battery, measured if possible under full load, preferably compared with a standard behavior or standard state of this battery type after the present operating period. Taking into account the known power consumption, in particular of the metering device, the signal processing and the radio module of this meter, selected radio parameters are modified depending on the residual capacity of the battery. For this purpose, the number of packet transmissions of the present type which are still possible with the presently residual battery capacity can be defined, for example calculated or derived from stored tables. However, in order to further extend the resulting operating period, at least one radio parameter, such as the transmit power of the radio module of this meter and/or its transmit clock, will henceforth be reduced accordingly until the scheduled battery exchange at the end of the operating time period specified in the system.

In particular, for this purpose, the number of packet transmissions still possible can be distributed in a spread manner over the remainder of the scheduled operating time period. This results in a reduced transmit clock for packet transmissions from this meter for the residual time period still remaining after the operating period thus far, wherein the frequency of the clock generator of the meter is reduced for the transmission of data packets. However, if the reception of meter data packets becomes too infrequent as a result, e.g. for a desired billing update of the consumption data, the transmit power is reduced over the residual time period of the specified operating time period if the remaining data rate is sufficiently high. A transition to a reduced-range waveform is also possible. For practical reasons, a deterioration in the reception conditions in the concentrator is sufficiently compensated by the repeated transmission of data packets of the meter and due to a plurality of concentrators distributed in the supply area.

If the radio modules, not only of the concentrator, but also of the meters, are equipped with a transceiver for bidirectional radio data transmission, the total outlay in terms of the processing power to be maintained in each case in the numerous meters of the supply area can be drastically reduced by determining the reduction, e.g. of the transmit clock of the data packets and/or the transmit power, required to attain the operating time period over the residual time period, only in the concentrators, possibly even only in the control center. For this purpose, the meter transmits information relating to the present state of its battery, preferably not separately, but with the data packet or as an attachment to a data packet, characterized, for example, by the battery voltage under load, to at least one of the concentrators in the supply area. The data rate for the system-specific operating time period is stored there. In response to the information relating to the battery state, the meter receives from the concentrator an indication of the, if necessary optimized, future transmit parameter, e.g. the transmit clock with a specified, possibly reduced transmit power, preferably also in the form of the coded new settings of the transmit clock generator and the transmitter output power in this meter with otherwise prematurely dwindling battery capacity.

For this meter, the residual capacity of its battery is thus compared with the residual time period of the battery operation in the other, normally operating, meters of this supply area by modifying selected radio parameters depending on the residual capacity of the battery to extend the residual time period.

Other features which are considered as characteristic for the invention are set forth in the appended claims. Additional alternatives and developments of the device and method according to the invention can be found in the further claims and, also taking into account the advantages thereof, from the following description of a preferred example embodiment of the invention.

Although the invention is illustrated and described herein as embodied in a method and a device for operating a battery-operated smart metering meter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SINGLE VIEW
OF THE DRAWING

Figure 2:
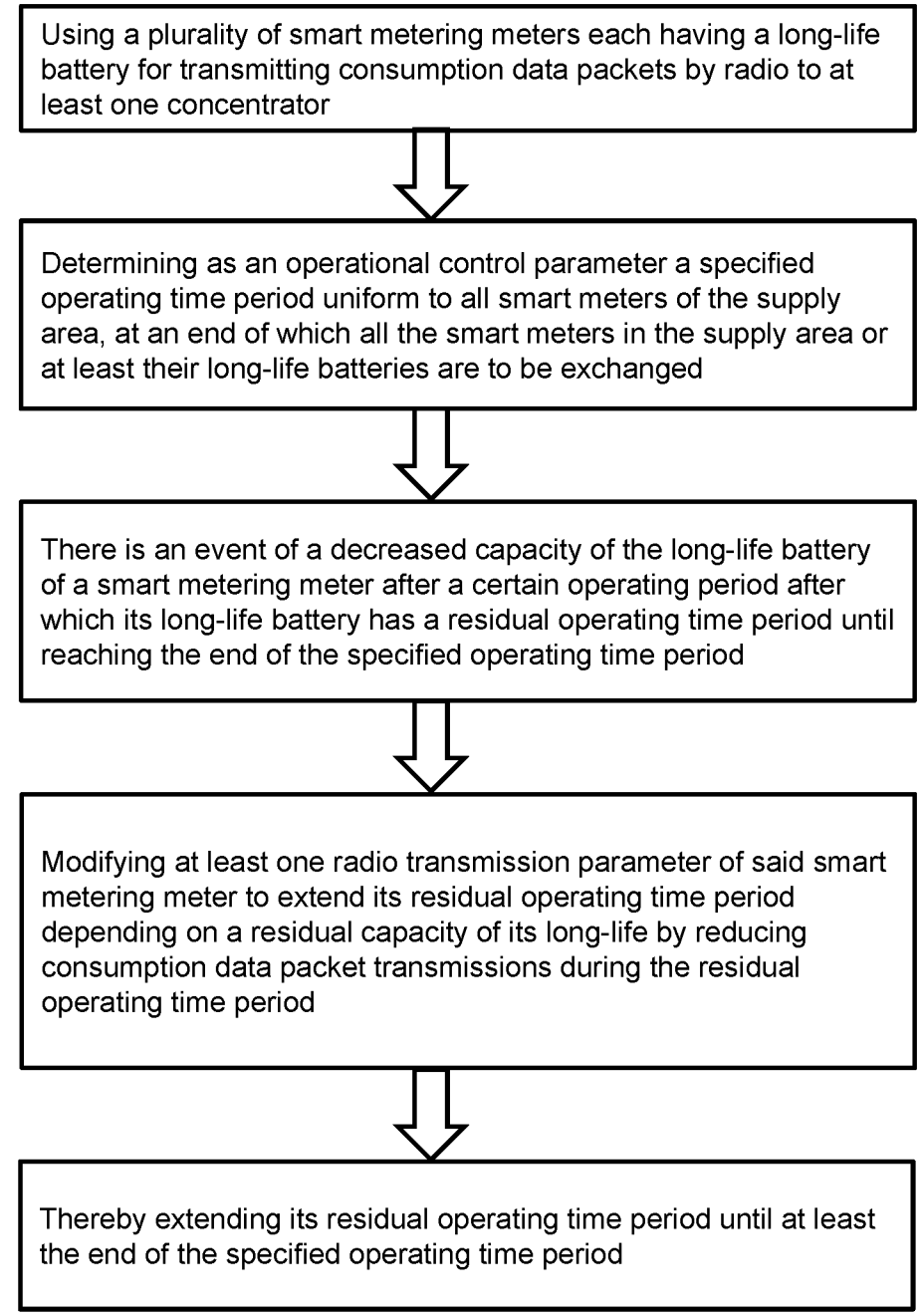

FIG. 1 is a block diagram reduced to the functionally important features of a device for battery management according to the invention of a smart metering meter; and FIG. 2 is a flow chart showing the steps of the method of the invention.

DETAILED DESCRIPTION OF THE
INVENTION

Referring now in detail to FIG. 1 of the drawing, there is seen a meter 11 which is one of many meters 11, 11a, 11b that communicate with at least one concentrator 13 in a supply area through, in this case bidirectional, radio links 12. Consumption data 15, in particular a flow of a fluid, are recorded by using an e.g. incrementally operating sensor 14 in or on a tap line of an energy source. The data are processed and, if necessary, digitized and accumulated in a signal processing unit 16 until they are transmitted from time to time, controlled through a clock generator 17, by using a transmitter 18 of a radio module 19 as a consumption data packet 20 to a receiver 25 of the radio module 19 in at least one of the concentrators 13 accessible in the supply area.

The meter 11 is equipped with a primary battery 21 for the operating energy of its functional components, i.e., in particular for the signal processing unit 16, the clock generator 17 and the radio module 19 and, if necessary, also the sensor 14. Battery information 26 relating to the present state of charge of the battery 21 is supplied by a detector 22 which, in this example embodiment, is constructed to measure the current battery voltage under full load. This information 26 is transmitted in any case from time to time, e.g. as an attachment to the data packet 20, to the receiver 25 in the concentrator 13. If it is established there in a voltage comparator 23 that, for example in this battery 21, the discharge curve is falling significantly more steeply than is typical for the battery, the residual battery capacity will not be sufficient to operate this meter 11 until the scheduled end of the operating time period. The number of present data packets 20 transmitted by the meter 11 by radio for which this residual capacity is still sufficient and a reduced transmit clock 27 acting through the signal processing unit 16 or directly on the meter transmitter 18 by which this number of data packets 20 can be evenly distributed over the current residual time period of the operating time period are therefore established in a table memory or in a computing circuit 24 for the residual battery capacity. This clock frequency specification, reduced compared with the normal operation, is transmitted through the receiver 25 of the radio module 19, operating bidirectionally in any event for that purpose, to the clock generator 17.

In a comparable manner (not shown in the drawing), the transmit power of the transmitter 18 can alternatively or additionally be reduced in the meter 11 through the computing circuit 24 in order to continue transmitting data packets 20 to the concentrator 13 despite dwindling battery capacity without a premature battery exchange over the residual time period until the end of the specified operating time period. For this type of transmission with transmit power reduced during the residual time period, other original transmit parameters such as the clock can be retained or, particularly in the case of a critical power budget for the residual time period, similarly reduced.

During the battery operation of a smart metering meter 11 which is equipped with a consumption sensor 14 and a transmit clock generator 17 for a radio module 19 for the transmission of consumption data packets 20, it is therefore determined according to the invention, in the event of a conspicuously decreased residual capacity of the battery 21, whether this residual capacity is sufficient for the intended data transmission. If it is not sufficient, the data packets 20 must be transmitted with at least one modified transmit parameter to a concentrator 13 over an extended time period until the scheduled battery exchange at the end of the specified operating time period. In order to do this, the data rate, for example, or the transmit level of the data packets 20 can be reduced over the residual time period and/or their transmit clock 27 can be extended. This determination, along with the control specification for the future operation of the transmitter 18, are performed in a control center, but preferably in a concentrator 13, and are transmitted by using directionally operating modules 19 to the meter 11 so that the computer capacities required for this purpose do not have to be retained in each of the numerous meters 11 of the supply area.

FIG. 2 is a flow chart showing the steps of the method of the invention described above.

Reference Number List 11, 11a, 11b Meters (with 14 and 19)
Radio link (between 11 and 13)
Concentrator
Sensor (from 11)
Consumption data (from 14, in 20)
Signal processing (between 14 and 18)
Clock generator (for 16/18 in 11)
Transmitter (from 19)
Radio module (from 11 or from 13)
Data packet (from 11 to 13)
Battery (in 11)
Detector (at 21)
Comparator (for 26)
Computing circuit (for 27 from 23)
Receiver (from 19)
Battery information (from 22, transmitted with 20)
Transmit clock (from 17, for 18/20)

The invention claimed is:

1. A method for operating a smart metering meter among a plurality of smart metering meters of a supply area each having a consumption sensor, a long-life battery and a transmit clock generator, the method comprising:

using the plurality of smart metering meters for transmitting consumption data packets by radio to at least one concentrator;

determining as an operational control parameter a specified operating time period uniform to all the smart meters of the supply area, at an end of which specified operating time period all the smart meters of the supply area or at least their long-life batteries are to be exchanged; and in an event of a decreased capacity of the long-life battery of the smart metering meter among the plurality of smart metering meters of the supply area after a certain operating period after which the long-life battery of said smart metering meter among said plurality of smart metering meters of the supply area has a residual operating time period until reaching the end of the specified operating time period:

modifying at least one radio transmission parameter of said smart metering meter among the plurality of smart metering meters of the supply area to extend its residual operating time period depending on a residual capacity of the long-life battery of the smart metering meter among the plurality of smart metering meters of the supply area to provide an extension of the residual operating time period until at least the end of the specified operating time period; and modifying said at least one radio transmission parameter includes defining a number of still transmittable consumption data packets, and transmitting the number of still transmittable consumption data packets in modified form during the residual time period until an end of the residual operating time period such that the number of packet transmissions still possible is distributed in a spread manner over a remainder of the specified operating time period.

2. The method according to claim 1, which further comprises modifying the at least one radio transmission parameter by reducing at least one of a transmit clock or a transmit power of the transmission of the consumption data packets.

3. The method according to claim 1, which further comprises obtaining information relating to a capacity of the long-life battery of the smart metering meter among the plurality of smart metering meters of the supply area from a battery voltage or from a battery internal resistance.

4. The method according to claim 3, which further comprises obtaining the information relating to the capacity of the long-life battery of the smart metering meter among the plurality of smart metering meters of the supply area under full load.

5. The method according to claim 1, which further comprises transmitting information relating to a capacity of the long-life battery of the smart metering meter among the plurality of smart metering meters of the supply area to a concentrator by radio.

6. The method according to claim 5, which further comprises transmitting the information relating to the capacity of the long-life battery of the smart metering meter among the plurality of smart metering meters of the supply area from the concentrator to a higher-level control center and transmitting specifications for at least one parameter to be modified from the higher-level control center by radio transmission back to the smart metering meter among the plurality of smart metering meters of the supply area.

7. The method according to claim 1, wherein the at least one radio transmission parameter is selected from at least one of a transmit clock, a transmit power, a data rate or a waveform modifying a range.

8. The method according to claim 1, which further comprises transmitting information relating to a capacity of the long-life battery of the smart metering meter among the plurality of smart metering meters of the supply area with the consumption data packets or as an attachment to the consumption data packets.

9. A device for operating a smart metering meter among a plurality of smart metering meters of a supply area each having a consumption sensor, a transmit clock generator, a long-life battery having a specific operating time period and a radio module for transmitting consumption data packets to a receiver of a radio module in at least one concentrator accessible in the supply area, the plurality of smart metering meters having an operational control parameter being a specified operating time period uniform to all the smart meters of the supply area, at an end of which specified operating time period all the smart meters in the supply area or at least their long-life batteries are to be exchanged, the device comprising:

a battery state detector for controlling at least one of the transmit clock generator of the smart metering meter among the plurality of smart metering meters of the supply area or a transmitter of the radio module of the smart metering meter among the plurality of smart metering meters of the supply area if a capacity of the long-life battery of the smart metering meter among the plurality of smart metering meters of the supply area has a critically reduced residual operating time period compared to the specific operating time period of the long-life battery of the smart metering meter among the plurality of smart metering meters of the supply area;

said battery state detector modifying at least one radio transmission parameter of the smart metering meter of the plurality of smart metering meters of the supply area to extend its residual operating time period depending on a residual capacity of the long-life battery of the smart metering meter of the plurality of smart metering meters thereby providing an extension of the residual operating time of the smart metering meter of the plurality of smart metering meters of the supply area until at least an end of the specific operating time period of the long-life battery of the smart metering meter among the plurality of smart metering meters of the supply area; and modifying said at least one radio transmission parameter includes defining a number of still transmittable consumption data packets, and transmitting the number of still transmittable consumption data packets in modified form during the residual time period until an end of the residual operating time period such that the number of packet transmissions still possible is distributed in a spread manner over a remainder of the specified operating time period.

10. The device according to claim 9, wherein said battery state detector is a voltage-measuring or an impedance-measuring detector.

11. The device according to claim 9, wherein a transmit power of the transmission of the consumption data packets is modified.

* * * * *